United States Patent [19]

Sagara

[11] Patent Number: 4,568,651

[45] Date of Patent: Feb. 4, 1986

[54] GLASS FOR MULTI-FOCAL EYEGLASS LENS

[75] Inventor: Hiroji Sagara, Tokyo, Japan

[73] Assignee: Hoya Corporation, Tokyo, Japan

[21] Appl. No.: 665,389

[22] Filed: Oct. 26, 1984

[30] Foreign Application Priority Data

Oct. 27, 1983 [JP] Japan ................................. 58-200078

[51] Int. Cl.$^4$ ...................... C03C 3/072; C03C 3/074; C03C 4/00
[52] U.S. Cl. ........................................ 501/75; 501/76; 501/903
[58] Field of Search ........................... 501/75, 76, 903

[56] References Cited

U.S. PATENT DOCUMENTS 4,128,432  12/1978  Komorita et al. .................. 501/901

Primary Examiner—Mark L. Bell
Attorney, Agent, or Firm—Cushman, Darby & Cushman

[57] ABSTRACT

A glass for multi-focal eyeglass having a refractive index ($n_d$) of 1.74 to 1.78, an Abbe number ($\nu_d$) of 31 or more, a coefficient of thermal expansion of 82 to $95 \times 10^{-7}$ and a softening point of 560° to 640° C., comprising, in % by weight, 26 to 34% $SiO_2 + B_2O_3 + Al_2O_3$;
14 to 24% $SiO_2$;
6 to 14% $B_2O_3$;
0 to 4% $Al_2O_3$;
38 to 50% PbO;
15 to 30% $BaO + SrO + CaO + MgO + ZnO$;
2 to 24% BaO;
0 to 17% SrO;
0 to 15% CaO;
0 to 10% MgO;
0 to 12% ZnO; and
0 to 3% $ZrO_2$;

wherein a weight ratio of $B_2O_3/SiO_2$ ranges from 0.3 to 0.8 and a weight ratio of alkaline earth oxides/PbO ranges from 0.2 to 0.6.

1 Claim, No Drawings

GLASS FOR MULTI-FOCAL EYEGLASS LENS

FIELD OF THE INVENTION

The present invention relates to a glass composition suitable for a high refractive index segment which can form a multi-focal eyeglass lens by fusion bonding to a major portion composed of a lightweight glass having a medium refractive index.

BACKGROUND OF THE INVENTION

In recent years, a lightweight eyeglass lens having a medium refractive index prepared from a glass having a relatively high refractive index $n_d$ of 1.60 to 1.61 but having a relatively small specific gravity of 2.5 to 2.6 has been commercially available. Such a lens has widely been made habitual use because lens is thinner and lighter than conventional lens having $n_d$ of 1.523 and provides improved sense of beauty and improved feeling of wearing. However, in the case that a fusion bonding type multi-focal lens is prepared using as a main portion a lightweight glass having a medium refractive index as described above, there is an inconvenience that the conventional glass for segment cannot be used. This is for the reasons that in the case of preparing a fusion bonding type multi-focal lens, it is generally required that the coefficient of thermal expansion of the segment be approximated to that of the main portion to prevent cracking after fusion bonding, and the softening point of the segment be set to a temperature slightly lower than the softening point of the main portion so as not to cause distortion of the main portion upon fusion bonding but the conventional glass for segment does not necessarily satisfy such requirements.

Therefore, a glass for segment having thermal properties suitable for a lightweight glass having a medium refractive index, namely, having a coefficient of thermal expansion of 82 to $95 \times 10^{-7}$ and a softening point (Littleton Point) of 560° to 640° C., and having a high refractive index $n_d$ of 1.74 to 1.78 is demanded.

A glass which almost satisfies those conditions is, for example, SF 13 (coefficient of thermal expansion $=80 \times 10^{-7}$, softening point $=604°$ C., $n_d=1.74077$) introduced in catalogue (1980 version) by Schott & Gen (West Germany). However, this glass involves disadvantages that not only the coefficient of thermal expansion is smaller than the desired value but also chromatic aberration is large due to its large dispersion of $\nu_d$ being 27.60. Accordingly, a large Abbe number is also the requirement necessary in the glass for segment.

In order to obtain a glass having a high refractive index, it is generally known to increase the proportion of components having high atomic valency of trivalent or more. As a result, however, the softening point of the glass increases and the coefficient of thermal expansion decreases. Conversely, the proportion of alkali metal oxides is increased in order to reduce the softening point of the glass and increase the coefficient of thermal expansion, but the refractive index decreases. Alkaline earth oxides impart middle properties between components of high atomic valency and alkali metal oxides. On the other hand, PbO decreases a softening point and reduces a coefficient of thermal expansion while it imparts a high refractive index.

SUMMARY OF THE INVENTION

As a result of extensive investigations on combinations of various components described above, it has been found that a glass having the desired properties can be obtained by strictly restricting the proportion of $SiO_2$ to $B_2O_3$ and the proportion of PbO to alkaline earth oxides, and the present invention has been accomplished.

Accordingly, an object of the present invention is to provide a glass for segment having properties of a coefficient of thermal expansion of 82 to $95 \times 10^{-7}$, a softening point of 560° to 640° C., $n_d$ of 1.74 to 1.78 and $\nu_d \geq 31$ and which is capable of forming a glass for multi-focal eyeglass by fusion bonding to a main portion composed of commercially available, lightweight glass materials having a medium refractive index. No glass having such properties has been known heretofore.

DETAILED DESCRIPTION OF THE INVENTION

The glass of the present invention has a composition comprising, in % by weight,
26 to 34% $SiO_2 + B_2O_3 + Al_2O_3$;
14 to 24% $SiO_2$;
6 to 14% $B_2O_3$;
0 to 4% $Al_2O_3$;
38 to 50% PbO;
15 to 30% $BaO + SrO + CaO + MgO + ZnO$;
2 to 24% BaO;
0 to 17% SrO;
0 to 15% CaO;
0 to 10% MgO;
0 to 12% ZnO; and
0 to 3% $ZrO_2$;
wherein the weight ratio of $B_2O_3/SiO_2 = 0.3$ to 0.8 and the weight ratio of alkaline earth oxides/PbO $= 0.2$ to 0.6, and has the properties of $n_d=1.74$ to 1.78, $\nu_d \geq 31$, a coefficient of thermal expansion $=82$ to $95 \times 10^{-7}$ and a softening point $=560°$ to 640° C. The present invention embraces not only a glass for segment but also a multifocal lens composed of the glass in combination with a lightweight glass having a medium refractive index.

The components constituting the glass of the present invention are explained in detail below. All percents herein are by weight.

The total amount of $SiO_2$, $B_2O_3$ and $Al_2O_3$ is limited to 26 to 34% in order to obtain a refractive index of the desired range. Further, in order to obtain a desired softening point, a ratio of $B_2O_3$ to $SiO_2$, $B_2O_3/SiO_2$, should be between 0.3 and 0.8 and the ranges for the respective components are limited to 14 to 24% and 6 to 14%, respectively. $Al_2O_3$ is effective to improve the chemical durability but if the amount thereof is more than 4%, the resistance to devitrification deteriorates.

PbO requires at least 38% in order to obtain a desired high refractive index but if the amount thereof exceeds 50%, a desired $\nu$ value cannot be maintained.

BaO, SrO, CaO, MgO and ZnO are components effective to increase the $\nu$ value but the total amount thereof is limited to 15 to 30% in order to maintain the coefficient of thermal expansion and softening point within the desired ranges. Of those components, BaO requires at least 2% in order to improve resistance to devitrification. However, if the amount thereof is more than 24%, it becomes difficult to control the coefficient of thermal expansion and softening point. SrO, CaO, MgO and ZnO result in poor resistance to devitrification upon fusion bonding if the amounts of these components exceed 17%, 15%, 10% and 12%, respectively.

Further, in order to obtain the desired coefficient of thermal expansion and softening point, the weight ratio of alkaline earth oxides to PbO, alkaline earth oxides/PbO, should be between 0.2 and 0.6.

$ZrO_2$ contributes to improve the chemical durability but if the amount thereof exceeds 3%, the softening point becomes too high. In addition, the spirit of the present invention is not affected by replacing $La_2O_3$, $TiO_2$, etc., for a part of $ZrO_2$ or by incorporating $As_2O_3$, $Sb_2O_3$, F, etc., for purposes of purification, decolorization, etc.

Examples of the present invention are shown in the following table, wherein respective components are expressed in % by weight.

| Component | Example No. | | | | | | | |
|---|---|---|---|---|---|---|---|---|
| | 1 | 2 | 3 | 4 | 5 | 6 | 7 | 8 |
| $SiO_2$ | 16.9 | 17.6 | 19.6 | 19.6 | 17.6 | 17.1 | 17.1 | 17.1 |
| $B_2O_3$ | 12.7 | 12.2 | 9.2 | 12.7 | 8.1 | 10.9 | 10.9 | 10.9 |
| $Al_2O_3$ | 2.0 | 2.0 | 2.0 | — | 3.0 | 2.0 | 2.0 | 2.0 |
| PbO | 48.3 | 48.1 | 44.5 | 44.0 | 42.5 | 47.6 | 47.6 | 47.6 |
| BaO | 12.4 | 8.9 | 6.2 | 19.5 | 12.4 | 15.0 | 5.0 | 7.0 |
| SrO | | | | | | | 10.0 | |
| CaO | 3.5 | 7.0 | 10.0 | | 7.0 | 7.0 | 7.0 | 7.0 |
| MgO | | | | | | | | 8.0 |
| ZnO | 3.1 | 3.1 | 7.1 | 3.1 | 7.0 | | | |
| $ZrO_2$ | 0.7 | 0.7 | 1.0 | 0.7 | 2.0 | | | |
| $B_2O_3/SiO_2$ | 0.75 | 0.69 | 0.47 | 0.65 | 0.46 | 0.64 | 0.64 | 0.64 |
| Alkaline earth oxide/PbO | 0.33 | 0.33 | 0.36 | 0.44 | 0.46 | 0.46 | 0.46 | 0.46 |
| $n_d$ | 1.772 | 1.759 | 1.757 | 1.742 | 1.768 | 1.764 | 1.762 | 1.754 |
| $\nu_d$ | 31.4 | 32.1 | 32.4 | 34.0 | 31.7 | 31.6 | 31.5 | 31.8 |
| Coefficient of thermal expansion ($\times 10^{-7}$) | 86 | 83 | 84 | 84 | 87 | 93 | 94 | 91 |
| Softening point (°C.) | 570 | 590 | 610 | 590 | 620 | 590 | 600 | 610 |

Glasses described above can be prepared by roughly melting a mixture of raw materials conventionally used such as siliceous stone powder, boric acid, aluminum hydroxide, lisage, barium carbonate, zinc flowers, zirconium oxide, etc., in a refractory crucible at 1,200° to 1,250° C., transferring the melt into a platinum-made crucible, remelting at 1,250° to 1,300° C., stirring the melt to homogenize, removing bubbles, casting into a mold previously heated at an appropriate temperature and then annealing the product.

While the invention has been described in detail and with reference to specific embodiments thereof, it will be apparent to one skilled in the art that various changes and modifications can be made therein without departing from the spirit and scope thereof.

What is claimed is:

1. A glass for multi-focal eyeglass having a refractive index ($n_d$) of 1.74 to 1.78, an Abbe number ($\nu_d$) of 31 or more, a coefficient of thermal expansion of 82 to $95 \times 10^{-7}$ and a softening point of 560° to 640° C., consisting of in % by weight, 26 to 34% $SiO_2 + B_2O_3 + Al_2O_3$;
14 to 24% $SiO_2$;
6 to 14% $B_2O_3$;
0 to 4% $Al_2O_3$;
38 to 50% PbO;
15 to 30% BaO+SrO+CaO+MgO+ZnO;
2 to 24% BaO;
0 to 17% SrO;
0 to 15% CaO;
0 to 10% MgO;
0 to 12% ZnO; and
0 to 3% $ZrO_2$;

wherein the weight ratio of $B_2O_3/SiO_2$ ranges from 0.3 to 0.8 and the weight ratio of alkaline earth oxides/PbO ranges from 0.2 to 0.6.

* * * * *